United States Patent

[11] 3,630,329

| [72] | Inventor | Roy A. Nelson |
| | | Grand Prairie, Tex. |
| [21] | Appl. No. | 66,509 |
| [22] | Filed | Aug. 24, 1970 |
| [45] | Patented | Dec. 28, 1971 |
| [73] | Assignee | LTV Aerospace Corporation |
| | | Dallas, Tex. |

[54] BRAKING AND COUPLING DEVICE
13 Claims, 12 Drawing Figs.

[52] U.S. Cl. .................................................. 192/8 R,
188/70 R, 188/134
[51] Int. Cl. ........................................................ F16d 67/00
[50] Field of Search ............................................. 192/8 R,
144; 188/134, 70

[56] References Cited
UNITED STATES PATENTS

| 2,031,186 | 2/1936 | Still ............................. | 192/8 R X |
| 2,223,217 | 11/1940 | Little ............................ | 192/8 R |
| 2,525,402 | 10/1950 | Dehn ............................ | 192/8 R X |
| 3,449,978 | 6/1969 | Stimpson ..................... | 188/134 X |

*Primary Examiner*—Allan D. Herrmann
*Attorney*—H. C. Goldwire

ABSTRACT: A mechanism for connecting a reversible, rotary driving means to a load to be moved and positioned thereby and employing a sleeve connected with input and output members by means comprising a pair of pins and a pair of bellcranks. A pair of cylindrical members, each member of the pair having a recess occupying substantially all of one end, an external flange which is coplanar with the other end, and a centrally located aperture therethrough, is coaxially positioned within a supporting structure that is fixedly mounted on a fixed structure. The cylindrical member ends containing the recesses mutually confront each other. The sleeve is coaxially positioned within the supporting structure with opposite end portions of the sleeve extending within the cylindrical member recesses. The input member extends through one cylindrical member aperture, and the output member extends through the other cylindrical member aperture. Forces imposed on the sleeve and originating in torques imposed on the input and/or output members urge the sleeve into braking contact with one or the other of the cylindrical members, each of which cylindrical members is free to rotate only in a direction opposite to that in which the other of such member is free to rotate.

ROY A. NELSON
INVENTOR
BY H C Goldwire
ATTORNEY

PATENTED DEC 28 1971

ROY A. NELSON
INVENTOR
BY J H C Goldwin
ATTORNEY

ROY A. NELSON
INVENTOR
BY H C Holdware
ATTORNEY

ROY A. NELSON
INVENTOR

BY *H C Goldwin*

ATTORNEY

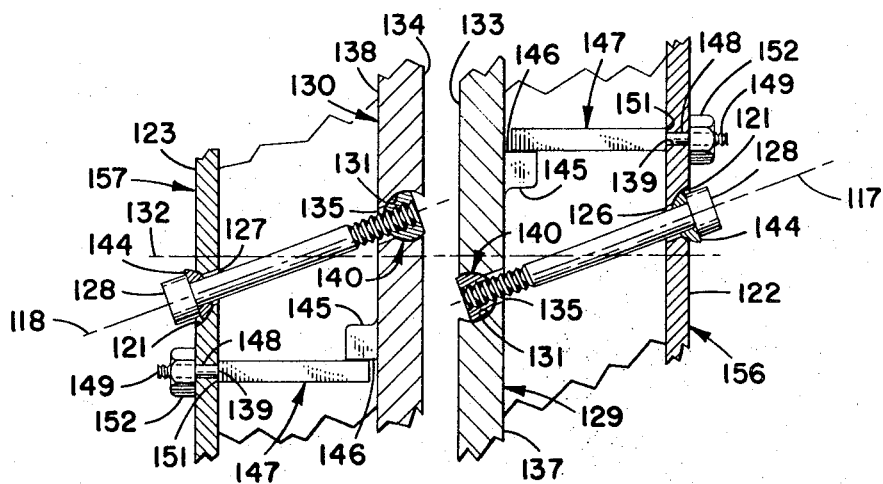
FIG 10
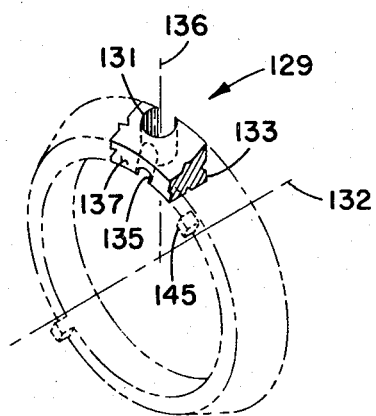
FIG 11
FIG 12
ROY A. NELSON
INVENTOR
BY *H.C. Goldwire*
ATTORNEY

BRAKING AND COUPLING DEVICE

This invention relates to clutches and power delivery controls of a positioning system for a load, and more particularly to transmission control and automatic braking of a drive shaft coupling device, which control and braking is responsive to imposed driving-means torque to release incorporated brakes.

A positioning system may utilize various combinations of mechanisms to couple a rotary driving means to a load to be moved and positioned thereby relative to a fixed structure. One mechanism often employed in such a positioning system is a braking and coupling mechanism. Such a mechanism is capable of acting not only as a directly driving coupling when the rotary driving means is operative, but is also capable of preventing torque-producing forces from the load to be moved and positioned from being transmitted back through the mechanism to the rotary driving means, thus preventing either overspeeding of the rotary driving means or overrunning of the desired load position, if the torque-producing force is in the same direction as the torque being produced by the rotary driving means. A braking and coupling mechanism is further capable of acting as a brake, when the rotary driving means is inoperative, to prevent torque-producing forces from the load from being transmitted through the mechanism to the idle rotary driving means and concurrently to lock the load to be moved and positioned in a set position.

A braking and coupling mechanism may be employed for direct coupling of a rotary driving means to an item to be positioned; generally, however, a braking-coupling mechanism is used in cooperation with an actuator or gearbox which either reduces the rotary speed of the rotary driving means or changes the rotary motion to linear motion. The mechanism, therefore, is generally located between the rotary driving means and an actuator or gearbox. Such a mechanism, when used to couple a rotary driving means to an actuator, is usually configured to have input and output drive shaft connections positioned within and extending out of a housing or supporting structure which is rigidly mounted on fixed structure. A braking-coupling mechanism, not always a separate device, may be incorporated within an actuator or gearbox. This has been frequently done, for example, in the aircraft industry where specially designed equipment is often made necessary because of critical weight and space limitations.

Braking-coupling mechanisms are especially desirable components for use in positioning systems utilizing ball-screw devices, for the friction in most ball-screw devices is so low that a load at the ball-screw device output connection will tend to reverse or overspeed the ball-screw device driving means.

Most actuators incorporating a ball-screw device efficiently utilize, to position a load, an input torque provided by a rotary driving means; for little of the input torque is needed to overcome frictional forces between the balls and the screw. The driving means for ball-screw actuators, therefore, usually require one-third or less the power required for driving means of other types of actuators. Ball-screw actuators are utilized throughout industry, but are exceptionally attractive for actuation of control surfaces for airplanes because of the relatively smaller and, consequently, lighter-weight driving means that ball-screw actuators require.

Existing braking-coupling devices have numerous shortcomings, especially in applications where synchronization of multiple positioning-systems is essential and loads impose torque-producing forces on the actuator output connections that result in torques either in the same direction as the torque from the rotary driving means or in torques in the opposite direction. Existing braking-coupling devices have further, undesirable characteristics in applications where weight and cost of the positioning systems are influencing factors, long operating life of the devices is necessary, and reliable lockup, release, and positioning of the load to be moved and positioned are mandatory.

Braking-coupling mechanisms of one existing type work well enough when new but become unreliable with wear. Such mechanisms usually have the common feature of components (such as levers and ball-ramp devices) that move to apply force to a brake; but the movement of these components is limited, with the result that, when they must move farther and farther to compensate for brake wear, they eventually reach their limit of movement, and slippage then occurs. Without adjustment or replacement of parts, more and more slippage occurs until little or no braking capability is left. Most existing braking-coupling devices have no convenient method of adjustment for wear to prolong their service life. Adjustments in many types of such devices entails partial disassembly for replacement of worn parts, the addition of shims, or the obtaining of access to adjusting screws.

Still other types of braking-coupling devices require very close manufacturing tolerances which vastly increase the unit cost of each device and the probability of failure because of contamination typified by the introduction of metallic particles, generated from wear or during manufacturing, into clearances between moving parts. A braking-coupling mechanism, requiring close manufacturing tolerances and containing components made of dissimilar metals each having different coefficients of expansion, is said to be temperature sensitive if any differential thermal expansion could cause possible seizing or galling of components or could cause an increase in clearances resulting in reduced braking power of the device. Temperature-sensitive mechanisms have, of course, restrictive uses.

In other types of braking-coupling mechanism, there are intentionally incorporated clearances between connecting parts that result in looseness which makes difficult the synchronization of multiple positioning systems and precise positioning of a load, as, for example, control surfaces of an airplane. "Looseness" refers herein to a condition permitting relative movement or play between two parts drivingly connected so that motion of one part relative to the other can occur. Limited back-motion of the driven member, therefore, can occur with respect to the driving member at any time. Looseness-producing clearances are necessary in many existing braking-coupling devices which use arms or levers either to move and expand brakeshoes or to move other components into and out of contact with friction surfaces; still other braking-coupling devices contain intentionally provided gaps between the teeth of splines to delay movement of one shaft while, for example, drivingly connected slip-clutches can disengage brakes.

Still another type of braking-coupling device performs well when primarily subjected to opposing loads, but wears out rapidly under conditions resulting when an object to be moved by an actuator tends to be moved by other forces (e.g., airloads) in the same direction as that in which the actuator and/or driving means is attempting to move the object; such load is usually referred to as an "aiding" load. Braking-coupling mechanisms that wear out rapidly under aiding loads inherently incorporate components which continually drag or rub rotating surfaces under an aiding-load condition. Some mechanisms require input torques from the rotary driving means that are larger than the torques required merely for moving the load. This is true for devices having one brake continuously acting in one rotative direction and another brake continuously acting in the other rotative direction; hence, the input torque must override a brake to move and position the load. As soon as the driving means is turned off and rendered inoperative, the brakes immediately lock the load in position. Still other braking-coupling devices incorporate continuously slipping clutches which consume and waste input torque from the rotary driving means, thereby lowering the efficiency of the positioning system.

Some other types of braking-coupling mechanism require specific limitations, often necessarily maintained within close tolerances, on the maximum and minimum braking capacities of their brakes. Braking capacity may be defined in terms of percentage of input torque (e.g., 200 percent of the input torque). Braking capacity is controlled by coefficients of friction of the braking surfaces. Usually, then, particular braking-surface materials are used that will have the proper coefficients of friction. Experience, however, has shown this type of device is very unreliable because wear, temperature, and contamination (introduction of foreign particles between braking surfaces) radically change or affect coefficients of friction. If a coefficient of friction becomes too low, the device employing it will not brake sufficiently to lock the load; and, if the coefficient of friction becomes too high, the release of the load is prevented, for the torque required to release the brake exceeds the torque capacity of the driving means. Another type of braking-coupling mechanism incorporates a spring which applies a force to brake discs; but, should a load to be moved and positioned transmit a torque-producing force to the mechanism which exceeds the constant spring-force applied to the brake discs, the mechanism will slip. Great care must, therefore, be used in determining the maximum torques the load to be moved and positioned will transmit to the braking-coupling device to assure the selection of a spring that will supply an adequate force.

Still another type of braking-coupling mechanism is not capable of small incremental adjustments of the position of the load. This type of device usually incorporates a continuously operating brake that must be overpowered before positioning of the load can be effected. Alternatively, such a braking-coupling device utilizes a single, locking-spring clutch on its output connection, which clutch is unlocked by rotation of the input connection in either rotative direction, with the consequence that a change in the direction of the feedback torque from the load, while the load is being moved, could prevent braking. Other types of braking-coupling devices have no mechanical brake-releases; thus, once the load is locked, a momentary overpowering of the brake is necessary to initiate the release. This type of device may incorporate two rotatably mounted, annular braking components, one of which is prevented from rotating in one direction and the other of which is prevented from rotating in the opposite direction. Rotation of input or output connection of this type of mechanism will cause an internal member of the mechanism to move and come into contact with one of the annular braking components. Should contact be made with one of the annular braking components by the internal member while the internal member is tending to rotate in the direction in which the annular braking component cannot rotate, then braking and locking will occur. In order to break such contact with the surface of the annular braking component, however, a momentarily overpowering torque is required to initiate movement of the internal member.

Heretofore, some braking-coupling mechanisms could overcome some of the above-mentioned problems, but always at the expense of retaining one or more of the remaining shortcomings.

It is, accordingly, a major object of the present invention to provide a new and improved braking-coupling mechanism for connecting a reversible, rotary driving means to a load to be moved thereby.

Another object of the present invention is to provide a braking-coupling device with braking and locking capabilities substantially unaffected by wear, temperature, or contamination of braking surfaces of the mechanism.

A further object is to provide, in such a device, a mechanical brake-releasing mechanism which eliminates the need of excessive torque to override the brake for releasing the load movement, and permits movement of the load in small, accurately controlled increments.

Yet another object is to provide a braking-coupling device having means for convenient, external adjustment for wear.

A still further object is to provide a braking-coupling mechanism that is as durable, reliable, and smooth in operation when positioning a load which acts in the aiding direction as it is when positioning a load which acts in the opposing direction with respect to the torque-direction of the driving means.

Still another object is to provide a braking-coupling mechanism not only with intentionally provided looseness, but without any backlash which is above the negligible and acceptable limits within which synchronization of multiple positioning systems and precise positioning of the load may be obtained.

An additional object is to provide such a device that is simple, compact, and free of the need of close manufacturing tolerances which would increase the unit cost of the mechanism and increase the probability of failure due to contamination or wear.

Another object is to eliminate the need, in a braking-coupling device, for closely controlled tolerances on coefficients of friction and maximum braking capacity, thereby obviating the problem of seizure and unreleasable locking occasioned by galling or undesired increase in maximum braking capacity on the one hand, or of loss of locking capability accompanying wear and a consequent reduction of braking capacity on the other.

A further object of this invention is to eliminate brake slippage in a braking-coupling device attributable to a load-imposed torque.

A still further object of this invention is to provide such a device which does not continuously consume and waste input torque.

Other objects and advantages will be evident from the specification and claims and the accompanying drawing illustrative of the invention.

In the drawing:

FIG. 10 is a partial, cross-sectional view taken along the line X—X in FIG. 9 and showing the spherical washers, the barrel nuts, the ring-shaped member lugs, and the cantilevered spring-pins;

FIG. 11 is a partial, fragmentary view of one of the ring-shaped members of FIG. 8, the balance of the ring-shaped member being indicated in phantom lines; and FIG. 12 is an isometric view of the barrel nut of FIG. 8.

Figure 1:
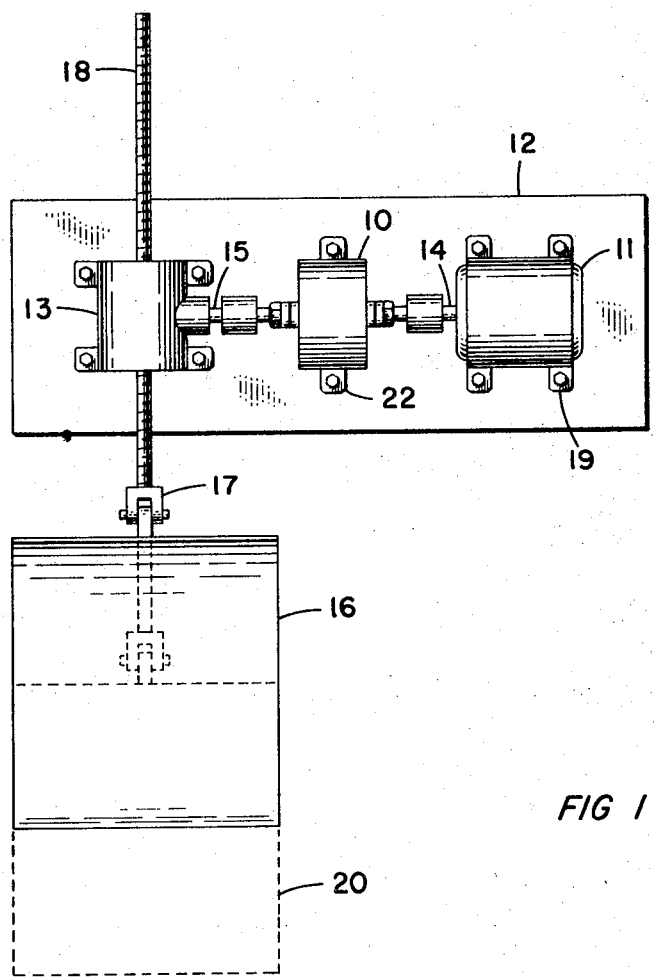
FIG. 1 is a diagrammatic representation of a positioning system incorporating the present invention.

With reference to FIG. 1, a diagrammatic representation of a positioning system incorporating a braking and coupling mechanism or device 10 is shown. The device 10, which is attached to a fixed structure 12, connects a reversible, rotary driving means 11 to a ball-screw actuator 13 by coupling their respective output and input shafts 14 and 15. The actuator 13, which converts rotary motion to linear motion, is connected to a load 16 by a clevis 17 that is rigidly attached to an end of the threaded actuator output shaft 18. The driving means 11, actuator 13, and braking-coupling device 10 are fixed by attachment, as by bolts 19, to the fixed structure 12. The actuator 13 responds to imposed driving-means torque and moves and positions the load 16 relative to the fixed structure 12, as between a first position in which the load is shown in solid line and a second position shown at 20 in broken line. If the actuator 13 is considered part of the load 16, (or where a load is rotatably positioned directly by the driving means and the actuator is omitted) then the braking-coupling mechanism 10 directly couples the rotary driving means 11 to the load and the load is moved by the driving means. In either case, the braking-coupling device 10 functions to transmit torque from the driving means 11 to the load 16 or actuator 13 when the driving means is operative and, concurrently, prevents torque-producing forces from the load from being transmitted back to the driving means. The rotary driving means 11, therefore, cannot be reversed or overspeeded by torque-producing forces from the load 16. When the rotary driving means 11 is not in operation, the braking-coupling mechanism 10 further acts as a brake which locks the load 16 in a set position and prevents torque-producing forces from the load from being transmitted to the idle driving means.

In subsequent paragraphs, the direction of rotation of any item described shall be determined by viewing the rotation from the side of the braking-coupling mechanism 10 that is connected to the rotary driving means 11.

Figure 2:
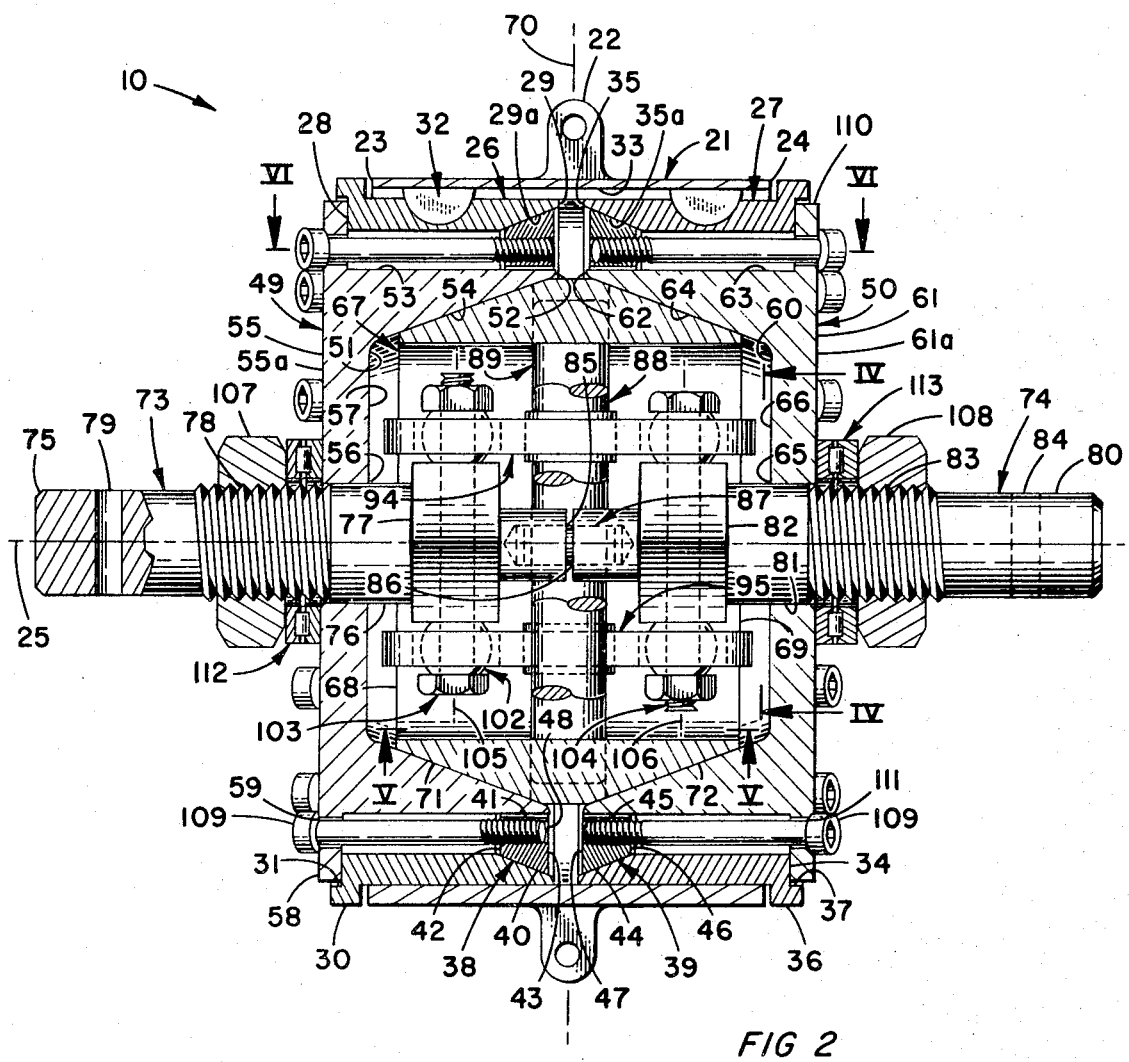
FIG. 2 is a longitudinal, partially sectional view of the present invention.

Referring now to FIG. 2, the braking-coupling device 10 comprises a supporting structure 21 preferably of a hollow, cylindrical shape and provided on its exterior with one or more mounting lugs 22 providing means for fixed mounting of the supporting structure relative to the fixed structure 12 (FIG. 1). The supporting structure 21 has a first and second, open ends 23, 24 which are rigidly connected in a mutually fixed relationship by the intervening material of the supporting structure and which ends are transfixed by the supporting structure longitudinal axis 25.

A first annular member 26 having a generally hollow, cylindrical shape, a longitudinal axis 25, a first open end 28, and an internally beveled second open end 29 is coaxially and fixedly positioned within the supporting structure 21. The first annular member 26 has an external flange 30 formed at its first open end 28, which flange has approximately the same outer diameter as the outer diameter of the supporting structure 21. The first annular member flange 30 forms an internal, circular recess 31 in cooperation with the first annular member first open end 28; the bottom of the recess is thus the first annular member first open end, and the internal circular surface of the recess has a diameter substantially equal to the outer diameter of the first annular member 26. The first annular member 26 is prevented from rotation relative to the supporting structure 21 by three keys 32 and keyways 33. The keyways 33 are formed in and equally spaced around the internal surface of the supporting structure 21, and the keyways run the full length of the supporting structure. The keys 32 are mounted on the first annular member 26 and positioned into the supporting structure keyways 33.

The second annular member 27 is substantially identical in construction to the first annular member 26 and thus has a first open end 34, an internally beveled second end 35, and an external flange 36 which forms an internal, circular recess 37 in cooperation with the second annular member first open end. The second annular member 27 is rotationally fixed relative to the supporting structure 21 in a manner similar to the affixing of the first annular member 26 to that structure. The second annular member 27 is coaxially positioned within the supporting structure 21.

The outer diameters of the first and second annular members 26, 27 have closely sliding fits with the internal surface of the supporting structure 21, the annular member beveled ends 29, 35 confront each other, the first annular member external flange 30 confronts and is spaced from the supporting structure first open end 23, and the second annular member external flange 36 similarly confronts and is spaced from the supporting structure second open end 24.

A first ring-shaped member 38 having a conical, outer surface 40 which complements the first annular member bevel 29a, a cylindrical inner surface 41, and first and second sides 42, 43 is coaxially positioned within the supporting structure 21 with its outer, conical surface confronting the first annular member beveled surface. The first and second sides of the first ring-shaped member 38 may, as shown, be parallel.

A second ring-shaped member 39 is substantially identical in construction to the first ring-shaped member 38 and thus has a conical, outer surface 44 which complements the second annular member bevel 35a, a cylindrical inner surface 45, and first and second sides 46, 47 which, as shown, may be parallel. The second ring-shaped member 39 is coaxially positioned within the supporting structure 21 with its conical, outer surface 44 confronting the second annular member beveled surface 35a.

Each ring-shaped member 38 or 39 has a plurality of threaded holes 48 (described later). When coaxially positioned within the supporting structure 21, the first and second ring-shaped members 38, 39 are spaced from each other along the supporting structure axis 25.

A first cylindrical member 49 having an end wall 51 closing one end 55 thereof, an open end 52, a generally cylindrical outer surface 53, a generally conical inner surface 54 extending between its closed end and open end, and an aperture 56 through the center of its closed end is coaxially positioned within the supporting structure 21. The end wall of the first cylindrical member 49 has exterior and interior surfaces 55a, 57 which are parallel to each other and perpendicular to the supporting-structure axis 25. The diameter of the conical inner surface of the first cylindrical member 49 is greatest at the first cylindrical member open end 52. The first cylindrical member 49 has an external flange 58 located at its closed end 55, which flange rests within the first annular member recess 31. The first cylindrical member flange 58 thus contacts the inner surface of the first annular member flange 30 and the first annular member first open end 28. The first cylindrical member external flange 58 has a plurality of apertures 59 therethrough, more fully described later.

A second cylindrical member 50 is constructed similarly to the first cylindrical member 49, and thus has an end wall 60 closing one end 61 thereof, an open end 62, a generally cylindrical outer surface 63, a generally conical inner surface 64 extending between its closed end and open end, and an aperture 65 through its closed end. Like the first cylindrical member 49, the second cylindrical member 50 is coaxially positioned within the supporting structure 21. The first and second cylindrical member open ends 52, 62 confront and are spaced from each other along the supporting structure axis 25. The end wall of the second cylindrical member 50 has exterior and interior surfaces 61a, 66 which are parallel to each other and perpendicular to the supporting-structure axis 25. The second cylindrical member 50 has an external flange 110 located at its closed end 61, which flange rests within the second annular member recess 37. Also, the second cylindrical member flange 110 contacts the inner surface of the second annular member flange 36 and the second annular member first open end 34. The second cylindrical member external flange 110 has a plurality of apertures 111 therethrough, discussed later.

A sleeve 67 has first and second ends 68, 69, a midplane 70 perpendicular to the supporting structure axis 25, and first and second external surfaces 71, 72 disposed on opposite sides of the midplane, each of which external surfaces confronts and complements a respective cylindrical member conical inner surface 54 or 64. The sleeve 67 is coaxially positioned within the supporting structure 21 and movable axially through a range, at each extreme of which range the sleeve is in contact with at least one of the cylindrical members 49 or 50. The sleeve ends 68, 69 are adjacent, and each spaced from a respective cylindrical member end wall 51 or 60 along the supporting structure axis 25.

The braking-coupling device 10 contains an input member 73 and an output member 74. The input member 73 is generally cylindrical and has first and second end portions 75, 76, a longitudinal axis 25, a hexagonally shaped, external flange 77 formed on its second end portion and an externally threaded portion 78 located between its first and second end portions. The input member 73 is coaxial with the supporting structure 21 and extends rotatably through the first cylindrical member aperture 56. The input member first end portion 75 has means for drivingly connecting the input member 73 to a rotary driving means 11, the connecting means being (for example) in the form of a connecting-pin hole 79 which is perpendicular to the input member axis 25.

The output member 74 is similar in construction to the input member 73 and thus has first and second end portions 80, 81, a longitudinal axis 25, a hexagonally shaped flange 82 formed on its second end portion, and an externally threaded portion 83 located between its first and second end portions. Similarly, the output member 74 extends rotatably through the second cylindrical member aperture 56, and the output member axis 25 is mutually aligned with that of the input member 73. The output member first end portion 80 has means, such as a connecting-pin hole 84, for drivingly connecting the output member 74 to a load. The input and output member second end portions 76, 81 mutually confront each other, and each second end portion has a cylindrical recess 85 or 86 that is coaxial with the supporting structure 21. As an aid in maintaining the input and output members 73, 74 in mutual alignment, a cylindrical dowel 87 is mounted in the recesses 85, 86 in their mutually confronting second end portions 76, 81.

Figure 4:
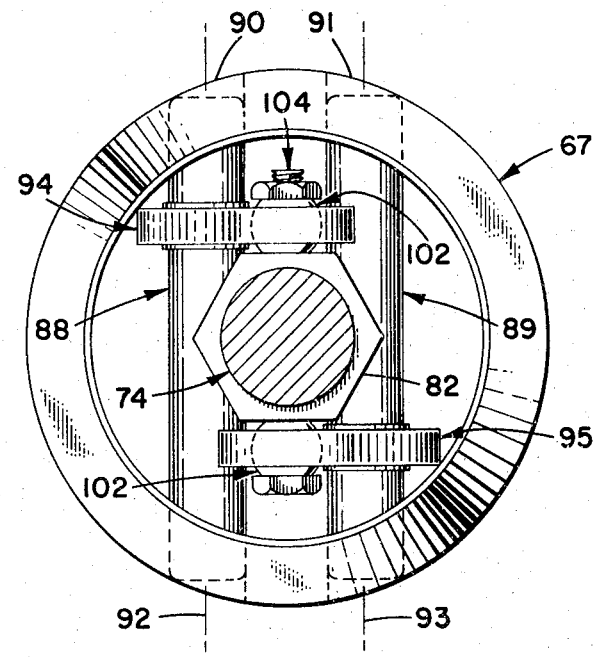
FIG. 4 is a partial, cross-sectional view taken along the line IV—IV in FIG. 2 and showing the relationship of the pins and bellcranks relative to the sleeve.
Figure 5:
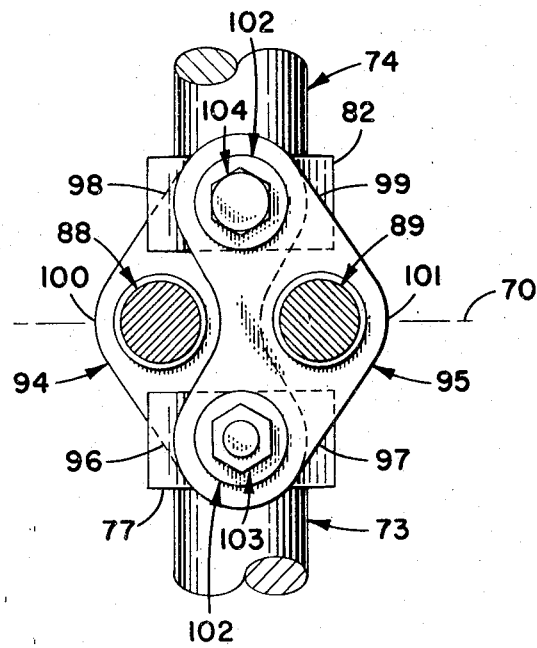
FIG. 5 is a partial, cross-sectional view taken along the line V—V in FIG. 2 and showing the relationship of the pins and bellcranks relative to the input and output members.

With added reference to FIGS. 4 and 5, the device 10 is provided with means joining the input member 73, output member 74, and sleeve 67 for concurrent rotation about the supporting structure axis 25 and for preventing translation of the input and output members relative to each other, which means will now be described. First and second, mutually cylindrical pins 88, 89 are mounted within first and second pairs of holes 90, 91 provided in the sleeve 67. Each pair of sleeve holes 90, 91 has coinciding axes which lie in the sleeve midplane 70, and the axes of the sleeve holes are parallel to each other. The pins 88, 89 also have, therefore, axes 92, 93 that lie in the sleeve midplane 70. First and second bellcranks 94, 95 are provided, each of which bellcranks has a first end portion 96 or 97, a second end portion 98 or 99, and a central portion 100 or 101. The first bellcrank 94 is pivotally and rotatably mounted at its central portion 100 (FIG. 5) on a respective one of the pins 88, and the second bellcrank 95 is similarly mounted on the other pin 89. The input member flange 77 is positioned between the two bellcrank first end portions 96, 97, and the output member flange 82 is positioned between the bellcrank second end portions 98, 99.

A means for pivotally and rotatably fastening the bellcrank first end portions 96, 97 to the input member 73 and the bellcrank second end portions 98, 99 to the output member 74 is provided, said means comprising a plurality of self-aligning bearings 102 (FIG. 2), a respective one of said bearings being mounted on each end portion of each of the bellcranks 94, 95, and first and second bolts and nuts 103, 104 which have axes 105, 106 that are parallel to each other and perpendicular to the supporting structure axis 25. The first bolt 103 extends through the self-aligning bearings 102 mounted on the bellcrank first end portions 96, 97 and through a suitable bore in the input member 73, and the second bolt 104 extends through the self-aligning bearings mounted on the bellcrank second end portions 98, 99 and through a bore in the output member 74.

Means preventing inwardly directed translation of the input and output members 73, 74 relative to the supporting structure 21 employs a first nut 107 engaging the input member threaded portion 78, a second nut 108 engaging the output member threaded portion 83, and respective bearings 112, 113 mounted on the input and output members and positioned between the nuts and the cylindrical members 49, 50. Each of the bearings 112 or 113 is located to bear against a respective one of the cylindrical member end wall exterior surfaces 55a or 61a.

Figure 3:
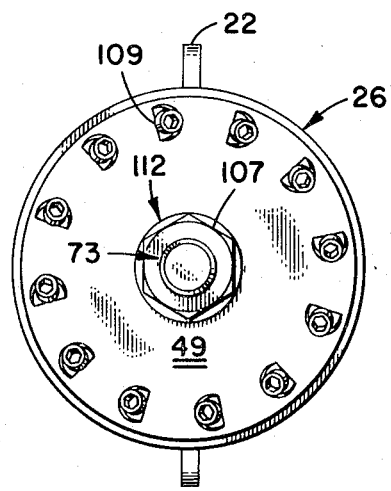
FIG. 3 is an end view of the present device, as viewed from the input-member side.

With reference to FIG. 2, a means for connecting the cylindrical members 49, 50 to the ring-shaped members 38, 39 and for preventing rotation of one of the ring-shaped members, relative to the supporting structure 21, in a first direction and of the other ring-shaped member, relative to the supporting structure, in a second direction about the supporting structure axis 25 comprises a plurality of bolts such as 109 engaging the ring-shaped member threaded holes 48 and extending through the cylindrical member flange apertures 59, 111. As shown in FIG. 3, the bolts 109 are equally spaced around the supporting structure axis 25, and each bolt extends through a respective cylindrical member flange 58 or 110 and has the same orientation and spatial relationship relative to the supporting-structure axis as each of the remaining bolts that extend through that same cylindrical member flange. One approach to understanding the relationship between the bolts 109 relative to each other and the relationship of each bolt relative to the supporting structure axis 25 is by visualizing a theoretical, cylindrical surface 114 (FIG. 7) having a longitudinal axis 115 coincident with the supporting structure axis 25 (FIG. 2) and a plurality of theoretical planes, one of which is shown at 116, which are equally spaced around and tangentially contact the theoretical, cylindrical surface. The theoretical, cylindrical surface 114 has a radius which extends from its longitudinal axis 115 for a distance equivalent to the distance from the supporting-structure axis 25 to a point lying between the inner and outer diameter of the ring-shaped members 38, 39 of FIG. 2. With added reference to FIG. 6,, one of the bolts 109 which extends through one of the first cylindrical member external flange apertures 59 has an axis 117 that lies in one of the theoretical planes such as 116, and one of the bolts which extends through one of the second cylindrical member external flange apertures 111 has an axis 118 that lies in the same theoretical plane. The tangential line 119 defined by the tangential contact of the theoretical plane 116 and the theoretical, cylindrical surface 114 is contained in both the plane and the cylindrical surface and is thus parallel to the theoretical, cylindrical surface axis 115. The axes of both of the bolts 109 which lie in the same theoretical plane 116 intersect the tangential line 119 contained therein; each bolt axis 117 or 118 thus forms an identical acute angle $\theta$ with the tangential line, and the bolt axes are parallel with each other.

The exact radius of the theoretical, cylindrical surface 114 may now be described as the radial distance between the theoretical, cylindrical surface axis 115 and the point of intersection between the tangential line 119 and the axis of one of the bolts 117 or 118.

Each one of the remaining bolts 109 which extends through one of the remaining first cylindrical member flange apertures 59 is paired with a respective one of the remaining bolts which extends through one of the remaining second cylindrical member flange apertures 111, and each pair of bolts is disposed similarly to the above-described pair of bolts, and (as shown in FIG. 3) the bolts are equally spaced around the supporting-structure axis 25.

Figure 6:
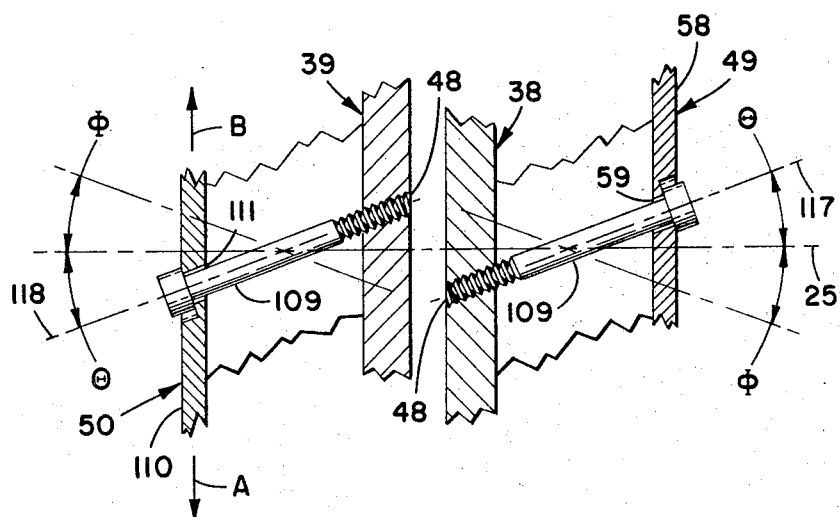
FIG. 6 is a partial, cross-sectional view taken along the line VI—VI in FIG. 2 and showing the relationship of the bolts which connect the cylindrical members to their corresponding ring-shaped members relative to the supporting-structure axis.

Referring to FIG. 6, the angular relationship of the bolts 109 relative to the cylindrical member flanges 58, 110 and ring-shaped members 38, 39 is such that each of the bolts lies an an acute angle $\theta$ (or, alternatively, an acute angle $\phi$) to the supporting structure axis 25. The angle selected is dependent, as is described later, upon the desired locking direction of the ring-shaped members 38, 39. The embodiment in FIG. 2 necessarily depicts the bolts 109 disposed by the angle $\theta$ to the supporting structure axis 25 to provide a desired locking of the first ring-shaped member 38 against clockwise direction of movement by the first cylindrical member 49 and a locking of the second ring-shaped member 39 against counterclockwise direction of movement by the second cylindrical member 50.

Prior to operation of the device 10, the nuts 107, 108 which are mounted on and engaged with the threaded portions of the respective input and output members 73, 74 are tightened to eliminate undesired looseness of the input and output members relative to each other and relative to the supporting structure 21 and to bring the cylindrical members 49, 50 into lightly dragging contact with the sleeve 67. The bolts 109 which extend through the first and second cylindrical member flange apertures 58, 111 and engage the respective first and second ring-shaped members 38, 39 are tightened to bring the ring-shaped members into lightly dragging contact with their corresponding annular members 26, 27.

In operation, the device of the foregoing construction and arrangement has several functional modes, in all of which modes the supporting structure 21 is rigidly mounted on any suitable, fixed structure 12 (FIG. 1) by means of the lugs 22. The first functional mode of the braking-coupling device 10 is one in which the driving means 11 is in the power-off condition and a load tends to rotate the output member of the device in a clockwise direction relative to the supporting-structure axis 25. The clockwise torque thus imposed on the output member 74 rotates the output member a relatively small angular distance in the clockwise direction (e.g., approximately 1 degree). During this incipient rotation of the output member 74, the load-produced torque is transmitted from the output member to the sleeve 67 and input member 73 through the pins 88, 89 (FIG. 5) and the bellcranks 94, 95 which are mounted in the sleeve. In accomplishing this, the bellcranks 94, 95 rotate slightly about the pins 88, 89, thus initially tending to rotate the input shaft 73 in the counterclockwise direction. Concurrently with the slight bellcrank movement, the load-produced torque received by the pins 88, 89 through the bellcranks 94, 95 is converted into an axial thrust force and a rotational force, and the pins thus transmit the load-produced torque to the sleeve 67 in the form of torque-equivalent forces. The axial thrust force acts in a direction that moves the sleeve 67 (FIG. 2) into firm contact with the first cylindrical member 49 and substantially out of contact with the second cylindrical member 50, and the rotational force acts in a direction which tends to rotate the sleeve in the clockwise direction. When the sleeve external surface 71 is strained against the conical, inner surface of the first cylindrical member 49, the sleeve 67 and first cylindrical member are frictionally locked together against relative rotational movement. The load-imposed, torque-equivalent forces are thus imparted to the first cylindrical member 49. The first cylindrical member 49 tends to rotate in the clockwise direction, but such tendency toward rotation only increases the tensional force in the bolts 109 which connect the first cylindrical member to the first ring-shaped member 38 (refer to FIG. 6), thereby further straining the first ring-shaped member against the first annular member 26. When the first ring-shaped member 38 is strained against the first annular member 26, the fist ring-shaped member is frictionally locked to the first annular member and relative rotation between the two is prevented. Since the first annular member 26 is prevented from rotation relative to the supporting structure 21 by the keys 32 and corresponding keyways 33, the first ring-shaped member 38 is likewise prevented from rotation relative to the supporting structure. Thus, the first ring-shaped member 38 and the bolts 109 which connect the first ring-shaped member to the first cylindrical member 49 prevent the clockwise rotation of the sleeve 67 and output member 74 to a negligible rotational movement (e.g., approximately 1 degree). Before the clockwise rotational force component of the load-imposed torque is transmitted to the input member 73 by the bellcranks 94, 95, the first ring-shaped member 38 brakes and locks the sleeve 67 and input member relative to the supporting structure 21 in the manner described above. In this functional mode, therefore, the device 10 not only restricts a load 16 (FIG. 1) which applies a clockwise torque on the output member 74 to a negligible movement but also prevents the load from being transmitted back to the idle driving means 11 which is connected to the input member 73.

The second functional mode to be discussed is one in which the driving means 11 (FIG. 1) is in the power-off condition and load-imposed torque from the load 16 has been in the clockwise direction as described above, but is reversed and tends to rotate the output member of the braking-coupling mechanism 10 in a counterclockwise direction relative to the supporting-structure axis 25. The reversed load produces a counterclockwise torque on the output member 74, and that torque rotates the output member a relatively small angular distance in the counterclockwise direction. In this mode, as in the first functional mode, the load-produced torque is transmitted from the output member 74 to the sleeve 67 and input member 73 through the pins 88, 89 and the bellcranks 94, 95 during the incipient rotation of the output member. The bellcranks 94, 95 rotate slightly about the pins 88, 89 thus tending initially to rotate the input shaft 73 in the clockwise direction. During this time, the bellcranks 94, 95 convert the load-produced torque into an axial thrust force and a rotational force and transmits the torque-equivalent forces to the sleeve 67 through the pins 88, 89. In this functional mode, the axial thrust force acts in a direction that unlocks the sleeve 67 from the first cylindrical member 49 by relieving the strain of the sleeve against the first cylindrical member and moves the sleeve away from the first cylindrical member and into firm contact with the second cylindrical member 50. Concurrently, the rotational force received by the sleeve 67 acts in a direction which tends to rotate the sleeve in the counterclockwise direction. When the sleeve external surface 72 is strained against the conical, inner surface of the second cylindrical member 50, the sleeve 67 and second cylindrical member are frictionally locked together against relative rotation movement about the supporting-structure axis 25. The load-imposed, torque-equivalent forces are thus imparted to the second cylindrical member 50, and the second cylindrical member tends to rotate in the counterclockwise direction. Such tendency toward counterclockwise rotation by the second cylindrical member 50 tends to rotate the second cylindrical member relative to the second ring-shaped member 39 and thus increases the tensional stress in the bolts 109 which connect the second cylindrical member to the second ring-shaped member, which increase in the bolt stress further strains the second ring-shaped member against the second annular member 27. Consequently, the second ring-shaped member 39 is frictionally locked to the second annular member 27, and relative movement between the two is prevented. Since the second annular member 27 is prevented from rotation relative to the supporting structure 21 by the keys 32 and corresponding keyways 33, the second ring-shaped member 39 is likewise prevented from rotation relative to the supporting structure. The bolts 109 connecting the second cylindrical member 50 to the second ring-shaped member 39 therefore prevent counterclockwise rotation of the second cylindrical member and restrict to a negligible movement the counterclockwise rotation of both the sleeve 67 and the output member 74, the sleeve being frictionally locked to the second cylindrical member and the output member being fastened to the sleeve by the pins 88, 89 and the bellcranks 94, 95. Before the counterclockwise rotational force component of the load-imposed torque is transmitted to the input member 73 by the bellcranks 94, 95, the second ring-shaped member 39 (as described) brakes and locks the sleeve 67 and input member relative to the supporting structure 21, the input member being fastened to the sleeve by the pins 88, 89 and bellcranks.

The larger the load-imposed torque, the larger the axial thrust force which forces the sleeve 67 against the second cylindrical member 50 and the larger the rotational force which tends to rotate the sleeve and second cylindrical member; the larger the rotational force imparted to the second cylindrical member, the larger the tensile stresses in the bolts 109 which force the second ring-shaped member 39 against the second annular member 27. Thus, the device 10 eliminates brake slippage attributable to load-imposed torques, whether such torques are large or suddenly applied. Elimination of brake slippage attributable to load-imposed torques prevents the load 16 from moving out of a set position. Just as in the first functional mode, the second ring-shaped member 39 brakes and locks the second cylindrical member 50 and the sleeve 67 before any force can be transmitted from the sleeve to the input member 73 by the pins 88, 89 and the bellcranks 94, 95 which are mounted in the sleeve. In this second functional mode, therefore, the device 10 restricts a load which applies a counterclockwise torque on the output member 74, while the driving means 11 is in the power-off condition, to negligible movement and, concurrently, prevents the load from being transmitted back to the idle driving means which is connected to the input member 73.

A third functional mode is one in which the driving means 11 is initially in the power-off condition and there is imposed on the output member 74 of the device 10 a load-produced torque which tends to rotate the output member in a clockwise direction relative to the supporting-structure axis 25 (FIG. 2) and in which the driving means subsequently is selectively activated to the power-on and clockwise output-torque condition wherein a clockwise torque is applied to the input member of the device for repositioning the load 16 in the aiding direction. By "an aiding load" or "a load acting in the aiding direction" it is meant that the object to be moved by the braking-coupling mechanism 10 tends to be moved by other forces (e.g., airloads) in the same direction as that in which the driving means 11 is tending to move it. An "opposing load," of course, is one in which the object to be moved by the driving means 11 tends to be moved by other forces in an opposite direction to that in which the driving means tends to move it. During the repositioning of the load 16 that occurs during operation in the third functional mode, the direction of the load-imposed force may be temporarily reversed to act in the opposing direction. Before the desired position of the load 16 is reached, the direction of the load-imposed force on the output member 74 may be returned to the aiding direction. The following description of the third functional mode, therefore, depicts a repositioning of a load 16 that initially acts in the aiding direction, changes to an opposing direction, and changes back to the aiding direction; whereupon, after the desired load position is reached, the driving means 11 is deactivated to its power-off condition, and the functional mode reverts from the third functional mode back to the first functional mode wherein the load is locked, relative to the supporting structure 21, in a precise position.

Prior to activating the driving means 11, the device 10 functions in a manner similar to its operation during the first functional mode (i.e., the load-produced force components received by the sleeve 67 act axially toward the first cylindrical member 49 and rotationally in the clockwise direction). As in the first functional mode, the sleeve 67 is forced against the first cylindrical member 49, and the sleeve and first cylindrical member are frictionally locked together against further relative rotational movement with respect to each other. The sleeve 67 and first cylindrical member 49 tend to rotate in the clockwise direction, but are locked against rotational movement relative to the supporting structure 21 by the first ring-shaped member 38 in cooperation with its clockwise, rotation-preventing bolts 109 as explained above. The device 10, therefore, locks the load 16 against movement relative to the supporting structure 21.

To effect repositioning of the load 16 in this functional mode, the driving means 11 is activated to the power-on and clockwise-torque output condition. The clockwise torque thus imposed on the input member 73 by the driving means 11 is transmitted to the sleeve 67 through the pins 88, 89 and the bellcranks 94, 95 (FIG. 5) which are mounted in the sleeve, as described below.

The input member 73 is rotated in the clockwise direction by the driving-means torque. During the incipient rotation of the input member 73, the bellcranks 94, 95 are rotated slightly about the pins 88, 89 which are mounted in the sleeve by the first bolt 103 which extends through the input member and the self-aligning bearings 102 mounted on the bellcrank first end portions 96, 97. The slight rotation of the bellcranks 94, 95 initially tends to rotate the output member 74 in the counter- clockwise direction. Since the nuts 107, 108 which are mounted on and engaged with the threaded portions of the respective input and output members 73, 74 are tightened to eliminate substantially all the looseness between the input and output members relative to each other and relative to the supporting structure 21, the means for pivotally and rotatably fastening the bellcrank first end portions 96, 97 to the input member and the bellcrank second end portions 98, 99 to the output member (which means for pivotally and rotatably fastening comprises the self-aligning bearings 102 which are mounted on each end portion of the bellcranks 94, 95 and first and second bolts 103, 104) restricts the relative rotation between the input and output members to a relatively small angular distance. Because relative rotation between the input and output members 73, 74 is restricted, the driving-means torque is transmitted to the sleeve 67 through the bellcranks 94, 95 and the pins 88, 89. The driving-means torque thus received by the pins 88, 89 through the bellcranks 94, 95 is converted into an axial thrust force and a rotational force, and the pins transmit the driving-means torque to the sleeve 67 in the form of torque-equivalent forces. In this third functional mode, the axial thrust force received by the sleeve 67 from the driving means 11 acts in a direction toward the second cylindrical member 50, which moves the sleeve away from the first cylindrical member 49 and toward the second cylindrical member, thus relieving the strain of the sleeve against the first cylindrical member, which strain against the first cylindrical member was caused by the load-imposed force. The rotational force components received by the sleeves 67 from the driving means 11 and the load 16 both act in the clockwise direction. If the load-produced forces received by the sleeve 67 are relatively large, the force components received by the sleeve from the driving means 11 reduce the force holding the sleeve against the first cylindrical member 49 enough to permit slippage between the sleeve and the first cylindrical member. If large enough, the outside forces acting on the load 16 (e.g., wind forces on an airplane control surface) actually reposition the load with the driving means 11 simply releasing the brakes of the braking-coupling device 10. During this repositioning of a relatively large aiding load, the exterior surface of the sleeve 67 continually slips against the inner conical surface of the first cylindrical member 40; and, since the input member 73, the output member 74, and the sleeve are connected together by the first and second bolts and nuts 103, 104, the bellcranks 94, 95 and the pins 88, 89, they rotate together in the clockwise direction and about the common axis 25.

The device 10, in the above-described condition, is capable of acting as a directly drivingly coupling; accordingly, torque applied to the input member 73 by the rotary driving means 11 is efficiently transmitted through the device to the actuator 13 of FIG. 1 (or load, if the load is to be moved rotationally and is connected to the output member of the device), and the actuator therefore repositions the load 16.

If the load-produced force received by the sleeve 67 is relatively small, the force components of the torque received by the sleeve from the driving means 11 overcome the load-produced force holding the sleeve against the first cylindrical member 49, and the net axial force acts in the direction of the second cylindrical member 50; the sleeve thus moves from contact with the first cylindrical member and into contact with the second cylindrical member. The second cylindrical member 50 is free to rotate in the clockwise direction; and the second cylindrical member, the sleeve 67, the input member 73, and the output member 74 therefore rotate as an assembly and in that direction, thereby repositioning the load 16, as explained above, in the aiding direction.

When the load-imposed torque received by the output member of the device 10 changes from acting in the clockwise direction to the counterclockwise direction, the load-imposed, torque-equivalent force components received by the sleeve 67 from the output member 74 also change direction. The axial thrust-force from the load 16 acts in the direction which tends to move the sleeve toward the second cylindrical member 50, and the rotational force from the load acts in the counterclockwise direction. Since axial thrust force components received by the sleeve 67 from the driving means 11 and the load 16 both act in the direction toward the second cylindrical member 50, the sleeve 67 moves away from the first cylindrical member 49 and into firm contact with the second cylindrical member 50. As the driving-means torque is always greater than an opposite, load-produced torque, the net rotational force component received by the sleeve 67 acts in the clockwise direction; accordingly, the device 10 thus continues to transmit a clockwise rotational force to the actuator 13 for repositioning the load. As a result, the device 10 continues smoothly and efficiently to transmit the driving-means torque to the actuator 13. While the device 10 is acting as a directly driving coupling, the second ring-shaped member 39 and the bolts 109 connecting it to the second cylindrical member 50 allow free rotation of the second cylindrical member (as described later).

As stated above, the second ring-shaped member 39 and the bolts 109 which connect the second ring-shaped member to the second cylindrical member 50 prevent counterclockwise rotation of the second cylindrical member relative to the supporting structure 21. Referring to FIG. 6, a tendency toward rotation of the second cylindrical member 50 in the counterclockwise direction shown by the arrow A tends to produce a relative counterclockwise rotation of the second cylindrical member 50 with respect to the second ring-shaped member 39 which in turn tends to enlarge the acute angles (depicted as angle $\theta$) formed by the bolt axes 118 intersecting the supporting-structure axis 25, with the result that the bolts 109 tend to be stretched. This increase in tension in the bolts 109 produces a force that moves the second ring-shaped member 39 into firm contact with the second annular member 27 (FIG. 2). The second ring-shaped member 39 is thus frictionally locked to the second annular member 27. Since the second annular member 27 is prevented from rotating relative to the supporting structure 21 by its keys 32 and cooperating keyways 33, the second ring-shaped member 39 is also prevented from rotating relative to the supporting structure.

The bolts 109 are sized such that the stretching force imparted to any one bolt by the cylindrical members 49, 50 will not produce a tensile stress within that bolt which exceeds its yield strength (i.e., no permanent deformation of the bolt will occur). Additionally, the size and material of the bolts 109 are selected to restrict the elastic elongation of the bolts for the purpose of eliminating undesired slippage between the second ring-shaped member 39 and its associated annular member 27 which would prevent precise positioning of the load 16.

The apertures of the external flange 110 of the second cylindrical member 50 and the corresponding threaded holes 48 of the second ring-shaped member 39 have respective axes 118 that are coincident with the axes of the bolts 109 which extend through the second cylindrical member flange apertures 111 and engage the second ring-shaped member threaded holes 48.

Accordingly, the second ring-shaped member 39 and the bolts 109 which connect the second cylindrical member 50 to the second ring-shaped member do not prevent or hinder clockwise rotation of the second cylindrical member, for the second ring-shaped member is not frictionally locked to the second annular member 27 (as explained later) and therefore rotates with the second cylindrical member. A tendency toward rotation of the second cylindrical member 50 in the clockwise direction shown by the arrow B (FIG. 6) tends to produce a relative clockwise rotation of the second cylindrical member with respect to the second ring-shaped member 39 which in turn tends to reduce the acute angles $\theta$ made by each of the bolt axes 118 with the supporting-structure axis 25, with the result that the bolts tend to be tensionally relaxed. Concurrently, the second cylindrical member 50 imposes a bending force on the bolts 109, and the reduction in tension in the bolts coupled with this bending force moves the second ring-shaped member away from contact with the second annular member 27 (FIG. 2). Once free from contact with the second annular member 27, the second ring-shaped member 39 is free to rotate about the supporting-structure axis. The second cylindrical member 50, therefore, transmits a rotational force to the second ring-shaped member 39 through the bolts 109 which connect the second cylindrical member to the ring-shaped member; since the imposed bending force on the bolts tends to bend the bolts relative to the second cylindrical member, a bending stress is generated in the bolts, which bending stress is transmitted to the second ring-shaped member. The second ring-shaped member 39 thus rotates with the second cylindrical member 50 in the clockwise direction, for the bending stress in the bolts 109 that is transmitted to the second ring-shaped member holds the second ring-shaped member from contact with its associated annular member 27.

The first ring-shaped member 38 and the bolts 109 which connect the first ring-shaped member to the first cylindrical member 49 similarly prevent clockwise rotation (and do not prevent counterclockwise rotation) of the first cylindrical member relative to the supporting structure 21. Likewise, the apertures of the external flange of the first cylindrical member 49 and the corresponding threaded holes of the first ring-shaped member 38 have axes that are coincident with the axes of the bolts 109 which extend through the first cylindrical member flange 58 and engage with the first ring-shaped member threaded holes 48.

Before the desired position of the load 16 is reached and in the example described, the direction of the load-imposed torque returns to the original aiding or clockwise direction. The net forces received by the sleeve 67 return it from contact with the second cylindrical member 50 to slight, dragging contact with the first cylindrical member 49. Since both the load and the driving-means rotational force components act in the clockwise direction, the net rotational force received by the sleeve 67 continues to be in the clockwise direction. The device 10 thus continues to transmit a clockwise rotational force to the actuator 13, and the actuator continues to move the load 16 smoothly in the aiding direction.

When the desired position of the load 16 is reached and upon the driving means 11 being deactivated to place it in its power-off condition, the torque applied by the driving means to the input member of the device 10 is eliminated. The output member 74, thus having ceased to be driven by the driving means 11 in the clockwise direction, has only a load-produced torque imposed on it. The forces received by the sleeve 67, therefore, are substantially the same as described in the first functional mode, and the load 16 is precisely locked (as previously described) in a set position.

The third functional mode illustrates that the device 10 is as durable, reliable, and smooth in operation when positioning an aiding load as when positioning an opposing load; for, although slippage may occur between the sleeve 67 and one of the cylindrical members 49 or 50 during the positioning of an aiding load, the contact between the sleeve and respective cylindrical member is relatively light, and the contacting surface areas are relatively large. Consequently, the pressure of the sleeve 67 against a respective cylindrical member 49 or 50, when slippage occurs during the repositioning of an aiding load, is relatively low and no galling or rapid wear therefore occurs. Moreover, such light contact between the relatively large contacting surface areas of the sleeve 67 against a respective cylindrical member 49 or 50 prevents a large temperature increase in the rubbing parts.

A fourth functioning mode is one in which the driving means 11 is initially in the power-off condition, the load-imposed torque on the output member 74 acts in the counterclockwise direction, and the driving means subsequently is selectively activated to the power-on and clockwise output torque condition to reposition the load 16. This is an opposing-load condition, since the load-imposed torque tends to move the load 16 in an opposite direction to that in which the driving means 11 tends to move the load. Prior to activating the driving means 11, the device 10 is in the same condition as described in the second functional mode. After activation of the driving means 11 in the fourth functional mode, a clockwise torque is imparted to the input member 73 by the driving means, which clockwise torque is transmitted to the sleeve 67 through the pins 88, 89 and the bellcranks 94, 95 (FIG. 5) in a manner similar to that which occurs in the third functional mode. In this fourth functional mode, the axial thrust force-component received by the sleeve 67 from the driving means 11 acts in a direction toward the second cylindrical member 50, thus adding to the axial thrust force produced by the load 16 and uninterruptingly continuing the strain of the sleeve against the second cylindrical member; as a consequence, the sleeve and second cylindrical member remain frictionally locked together against rotational movements relative to each other. Simultaneously with the above, the rotational force-component of the torque received by the sleeve 67 from the driving means 11 tends to rotate the sleeve in the clockwise direction, a direction opposite to the direction that the load 16 tends to rotate the sleeve. Since the clockwise rotational force-component of the torque received by the sleeve 67 from the driving means 11 is larger than the counterclockwise rotational force-component received by the sleeve from the load 16, the net rotational force imposed on the sleeve acts in the clockwise direction; therefore, the sleeve departs from a tendency to rotate in the counterclockwise direction and tends to rotate in the clockwise direction. The second cylindrical member 50 is free to rotate in the clockwise direction, for the second ring-shaped member 39 and the bolts 109 which connect the second ring-shaped member to the second cylindrical member prevent only counterclockwise rotation; therefore, the mutually locked sleeve 67, second cylindrical member, second ring-shaped member, input member 73, and output member 74 are free to rotate together in the clockwise direction relative to the supporting structure 21. The braking-coupling device 10, in the above-described condition, is capable of acting as a directly driving-coupling; as in the third functional mode, the torque applied to the input member 73 by the rotary driving means 11 is efficiently transmitted through the device to the actuator 13 (FIG. 1) and the actuator responds to the driving-means torque received by it and positions the load 16 accordingly.

When the desired position of the load 16 is reached and upon the driving means 11 being deactivated to place it in its power-off condition, the torque applied by the driving means to the input member 73 is eliminated. The output member 74, thus having ceased to be driven by the driving means 11 in the clockwise direction, has only a load-produced counterclockwise torque on it, which torque immediately tends to reverse the clockwise rotation of the sleeve 67.

When the driving means 11 is deactivated, therefore, the axial thrust and rotational forces received by the sleeve 67 are substantially the same as described in the second functional mode (i.e., the axial thrust force acts in the direction toward the second cylindrical member 50 and the rotational force acts in the counterclockwise direction). Since the axial thrust-force acts in the same direction, whether the driving means 11 is in the power-on or power-off condition, the sleeve 67 remains uninterruptedly locked to the second cylindrical member 50. The counterclockwise, load-produced torque received by the sleeve 67 tends to rotate the sleeve in the counterclockwise direction, but such rotation is immediately braked and locked, relative to the supporting structure 21 and with substantially no possibility of motion of the sleeve relative to the supporting structure, by the second ring-shaped member 39 and the bolts 109 which connect the second ring-shaped member to the second cylindrical member, as previously described. When the sleeve 67 is thus locked, the output member 74 and the actuator 13 and load 16 (FIG. 1) connected thereto are also similarly locked. Because the device 10 is capable of the operations described above in connection with its third and fourth functional modes, intentionally provided looseness (necessary in many existing braking-coupling mechanisms) is not required in the present device; and the device, because of the absence of such looseness, is thus capable of providing precise positioning of the load 16. Furthermore, the braking-coupling mechanism 10, without requiring close manufacturing tolerances, is devoid of any looseness of connection which is above the negligible and acceptable limits within which synchronization of multiple positioning systems is obtainable.

A fifth functional mode is one in which the driving means 11 is initially in the power-off condition, the load-imposed torque on the output member 74 acts in the clockwise direction, and the driving means subsequently is selectively activated to the power-on and counterclockwise output torque condition to reposition the load 16. This functional mode involves an opposing-load condition, since the load-imposed torque tends to move the load 16 in an opposite direction to that in which the driving means 11 tends to move the load. Prior to activating the driving means 11, the mechanism 10 is in the same condition as described in the first functional mode. After activation of the driving means 11 in this functional mode, the input member 73 is driven in the counterclockwise direction. The driving-means torque received by the input member 73 is transmitted to the sleeve 67 in a manner similar to that in the third and fourth functional modes. In this fifth functional mode, the axial thrust force-component received by the sleeve 67 from the driving means 11 acts in a direction tending to move the sleeve toward the first cylindrical member 49 and thus adds to the axial thrust force produced by the load 16 and uninterruptingly continues the strain of the sleeve against the first cylindrical member; as a consequence, the sleeve and first cylindrical member remain frictionally locked together against rotational movement relative to each other. Concurrently with the above, a rotational force-component of the torque received by the sleeve 67 from the driving means 11 tends to rotate the sleeve in the counterclockwise direction, a direction opposite to the direction that the load 16 tends to rotate the sleeve. Since the counterclockwise rotational force-component of the torque received by the sleeve 67 from the driving means 11 is larger than the clockwise rotational force-component received by the sleeve from the load 16, the net rotational force imposed on the sleeve acts in the counterclockwise direction; therefore, the sleeve departs from a tendency to rotate in the clockwise direction and tends to rotate in the counterclockwise direction. The first cylindrical member 49 is free to rotate in the counterclockwise direction, for its associated first ring-shaped member 38 and interconnecting bolts 109 prevent only clockwise rotation (as explained in the third functional mode); therefore, the mutually and frictionally locked sleeve 67 and first cylindrical member are free to rotate, with the first ring-shaped member, in the counterclockwise direction. During the above, the input member 73 transmits the net rotational force-component, as a counterclockwise torque, to the output member 74 through the sleeve 67, the pins 88, 89, and the bellcranks 94, 95.

When the desired position of the load 16 is reached and upon the driving means 11 being deactivated to place it in its power-off condition, the torque applied by the driving means to the output member 74 through the input member 73, the sleeve 67, the interconnecting bellcranks 94, 95, and the pins 88, 89 is eliminated. The output member 74, thus having ceased to be driven by the driving means 11 in the counterclockwise direction, has only a load-produced torque imposed on it, and the load-produced torque immediately tends to reverse the counterclockwise rotation of the output member, which tendency is prevented as described below.

When the driving means 11 is deactivated, therefore, the axial thrust and rotational forces received by the sleeve 67 are substantially the same as described in the first functional mode (i.e., the axial thrust force acts in the direction tending to move the sleeve toward the first cylindrical member 49 and the rotational force acts in the clockwise direction). Since the axial thrust force acts in the same direction, whether the driving means 11 is in the power-on or power-off condition, the sleeve 67 remains uninterruptedly locked to the first cylindrical member 49. The clockwise, load-produced torque received by the sleeve 67 tends to rotate the sleeve in the clockwise direction, but such rotation is immediately braked and locked, relative to the supporting structure 21 and with substantially no possibility of motion of the sleeve relative to the supporting structure, by the first ring-shaped member 38 and the bolts 109 which extend through the first cylindrical member and engage the threaded holes of the first ring-shaped member, as described in the third functional mode. When the sleeve 67 is thus locked, the output member 74 and the actuator/load 13, 16 (FIG. 1) connected thereto are also similarly locked.

If, before reaching the desired position of the load 16, the load-imposed torque on the output member 74 reverses and acts in the counterclockwise direction, then the load-imposed force-components received by the sleeve 67 act in opposite directions; namely, a thrust force-component which tends to move the sleeve toward the second cylindrical member 50 and a rotational force-component which tends to move the sleeve in the clockwise direction. The axial thrust force-component of the load-imposed torque thus opposes the axial thrust force-component received by the sleeve 67 from the driving means 11, and the rotational force-component of the load-imposed torque acts in the same direction as that of the rotational force-component received by the sleeve from the driving means.

The next axial thrust force received by the sleeve 67 continues to act in a direction toward the first cylindrical member 49, but decreases in magnitude after the change in direction of the load-imposed torque. Thus, the sleeve 67 initially remains uninterruptedly locked to the first cylindrical member 49. When the direction of the net axial thrust force-component changes, as is the case when the net rotational force-component received by the sleeve 67 is greater than the rotational force-component of the driving-means torque received by the sleeve, the net axial thrust force unlocks the sleeve from the first cylindrical member 49 by relaxing the strain of the sleeve from the first cylindrical member and move the sleeve away from contact with the first cylindrical member and into contact with the second cylindrical member 50. Since the second cylindrical member 50 is prevented from counterclockwise rotation by its associated second ring-shaped member 39 and interconnecting bolts 109, braking of the sleeve 67 occurs as soon as the counterclockwise-rotating sleeve contacts the second cylindrical member. Consequently, the load 16 cannot overspeed the driving means 11 when acting in the aiding direction relative to the torque direction of the driving means; moreover, an aiding load cannot prevent precise positioning of such load, for as soon as the desired position is reached and upon the driving means being placed in its power-off condition, the torque applied to the sleeve 67 by the driving means is eliminated and the braking-coupling device 10 immediately reverts to its first or second functional mode of operation. Once the mechanism 10 is in the first or second functional mode of operation, the load 16 is immediately locked, relative to the supporting structure 21 and with substantially no possibility of movement of the sleeve 67 relative to the supporting structure, as described in connection with the first and second functional modes. The sleeve 67 responds substantially immediately to forces received by it from the driving means 11. Thus, the sleeve 67 locks or unlocks relative to the supporting structure 21 substantially immediately in response to activation or deactivation of the driving means 11. Consequently, the device 10 permits movement of the load 16 in small, accurately controlled increments by manual or automatic activation and deactivation of the driving means 11.

Unlike the previously existing braking-coupling mechanisms, the mechanism 10 described herein contains a mechanical brake-releasing mechanism of a construction which eliminates the need of excessive torque to override or to disengage brakes in order to position a load. It is important to note that the brake-releasing mechanism of the present device 10 utilizes force-components to disengage and shift the sleeve 67 from the cylindrical member 49 or 50 that brakes and locks the load 16 relative to the supporting structure 21, with the aid of an associated ring-shaped member 38 or 39, to the cylindrical member that has an associated ring-shaped member that permits rotation in the rotative direction of the driving-means torque and thus permits the driving means 11 to reposition the load. The operations which occur in the fifth functional mode further illustrate that such a device 10 is as durable, reliable, and smooth in operation when positioning a load which acts in the aiding direction relative to the torque direction of the driving means 11 as it is when positioning a load which acts in the opposing direction relative to the torque direction of the driving means.

A sixth and last functional mode is one in which the driving means 11 is initially in the power-off condition, the load-imposed torque on the output member 74 acts in the counterclockwise direction, and the driving means subsequently is selectively activated to the power-on and counterclockwise output torque condition to reposition the load 16. This mode involves an aiding load condition, since both the load-imposed torque and the driving means 11 tend to move the load 16 in the same direction. Prior to activating the driving means 11, the device 10 is in the same condition as described in connection with the second functional mode. The driving-means torque received by the input member 73 is transmitted to the sleeve 67 through the bellcranks 94, 95 and the pins 88, 89 located in the sleeve in a manner similar to that in the other functional modes. The axial thrust force-component received by the sleeve 67 from the driving means 11 acts in a direction toward the first cylindrical member 49, thus opposing the axial thrust force imposed on the sleeve by the load 16. During the above, a rotational force-component of the torque received by the sleeve 67 from the driving means 11 tends to rotate the sleeve in the counterclockwise direction, which is the same rotative direction that the load 16 tends to rotate the sleeve.

The axial thrust force received by the sleeve 67 from the driving means 11 through the input member 73, the bellcranks 94, 95, and the pins 88, 89 acts in a direction which tends to move the sleeve away from the second cylindrical member 50 and toward the first cylindrical member 49, thus relieving the strain of the sleeve against the second cylindrical member. The rotational force-components received by the sleeve 67 from the driving means 11 and the load 16 both act in the counterclockwise direction. If the load-produced forces received by the sleeve 67 are relatively large, the net axial thrust force-component received by the sleeve from the load 16 and driving means 11 reduces the force holding the sleeve against the second cylindrical member 50 enough to permit slippage between the sleeve and second cylindrical member. As in the third functional mode, the driving means 11 merely releases the brakes of the braking-coupling device 10 and the outside forces acting on the load 16 actually reposition the load. During this repositioning effected by a relatively large aiding load, the external surface of the sleeve 67 continually slips against the inner conical surface of the second cylindrical member 50; and since the input member 73, the output member 74, and the sleeve are connected together by the pins 88, 89 and the bellcranks 94, 95, they rotate together about their common axes 25. When the sleeve 67 rotates, torque is thus transmitted through the braking-coupling mechanism 10 from the input member 73 to the output member 74. From the foregoing description, it is clearly illustrated that the device 10 automatically brakes and frictionally locks the sleeve 67 against relative rotation with respect to the supporting structure 21 whenever the sleeve is tending to respond merely to load-imposed torques which are imposed on the output member of the device. Only when a driving-means torque is imposed on the input member of the device 10 may a net torque be transmitted through the device, for (as explained above) the brakes of the device are released in response to a driving-means torque. As described in the other functional modes, the torque received by the output member 74 from the driving means 11 is transmitted to the load 16 through the actuator 13 (FIG. 1).

If the load-produced force received by the sleeve 67 is relatively small, the force components of the torque received by the sleeve from the driving means 11 overcome the load-produced torque force holding the sleeve against the second cylindrical member 50 and the net axial force acts in the direction tending to move the sleeve toward the first cylindrical member 49; the sleeve thus moves from contact with the second cylindrical member and into contact with the first cylindrical member. The first cylindrical member 49 is free to rotate in the counterclockwise direction, and the first cylindrical member, the sleeve 67, the first ring-shaped member 38, the input member 73, and the output member 74 thus rotate as an assembly, thereby driving the actuator 13 and the load 16, as previously explained.

When the desired position of the load 16 is reached and upon the driving means 11 being activated to place it in its power-off condition, the torque applied by the driving means to the output member 74 through the input member 73, the sleeve 67, the bellcranks 94, 95, and the pins 88, 89 is eliminated. The output member 74, thus having ceased to be driven by the driving means 11 in the counterclockwise direction, has only a load-produced torque imposed on it, and the load-produced torque immediately tends to reverse the counterclockwise rotation of the output member and is prevented from doing so as will appear below.

When the driving means 11 is deactivated, therefore, the axial thrust and rotational forces received by the sleeve 67 are substantially the same as described in the second functional mode (i.e., the axial thrust force acts in the direction tending to move the sleeve toward the second cylindrical member 50, and the rotational force acts in the counterclockwise direction) and the load 16 is precisely locked in a set position.

The braking-coupling device's capability of braking and locking a load is substantially unaffected by wear of the contacting surfaces of the deive's sleeve 67 and the cylindrical members 49, 50 because the relative axial movements between the sleeve and cylindrical members are not limited to a specific maximum dimension. If wear increases the clearance between the sleeve 67 and an cylindrical member 49 or 50, the sleeve is capable of increased axial movement with respect to such cylindrical member, and the sleeve is thus always capable of being promptly moved into firm contact with one of the cylindrical members. The only significantly adverse effect of wear on such a device 10 is in the introduction of a relatively small amount of looseness between the sleeve 67 and the cylindrical members 49, 50 and between the ring-shaped members 38, 39 and their corresponding annular members 26, 27, which looseness is caused by an increase in clearance between the various rubbing parts. The undesired relative axial movement between the sleeve 67 and the cylindrical members 49, 50 can be eliminated by tightening the nuts 107, 108 which engage the respective input and output member threaded portions 78, 83, as described above, prior to operation of the device 10. The undesired relative axial movement of the first and second ring-shaped members 38, 39 and respective annular members 26, 27 can be eliminated by tightening the bolts 109 which extend through the cylindrical members 49, 50 and engage the ring-shaped members, which tightening of the bolts moves the first and second ring-shaped members outwardly with respect to the supporting structure and thus reduces the clearance between the ring-shaped members and their corresponding annular members. The nuts 107, 108 and bolts 109, which are located outside the supporting structure 21, therefore present a means for convenient, external adjustment for wear.

Since firm contact is always obtainable between the sleeve 67 and the cylindrical members 49, 50, the braking surfaces of the sleeve and cylindrical members do not require closely controlled tolerances to obtain a reliable braking and locking capability for the braking-coupling device 10. Neither do the braking surfaces of the first and second ring-shaped members 38, 39 and their confronting annular members 26, 27 require closely controlled tolerances to obtain a reliable braking and locking capability for the device 10. Neither do the braking surfaces of the first and second ring-shaped members 38, 39 and their confronting annular members 26, 27 require closely controlled tolerances to obtain a reliable braking and locking capability for the drive 10; for relative rotation of the first or second cylindrical member 49 or 50 with respect to its corresponding ring-shaped member will, in cooperation with its interconnecting bolts 109, move its associated ring-shaped member into or away from firm contact with the respective annular member that confronts the ring-shaped member, whether the clearances are close or not. Further, a maximum braking capacity, above which capacity slippage occurs, is not employed; for, unlike many existing braking-coupling mechanisms and by virtue of employment of a mechanical brake-releasing mechanism, the driving-means torque does not have to override brakes to reposition a load. Inherent problems associated with closely controlled tolerances of coefficients of friction, such as seizure and unreleasable locking occasioned by wear-induced galling on the one hand or loss of locking capability accompanying wear and a consequent reduction of braking capacity on the other, are eliminated because such tolerances are not utilized in the device 10.

The braking-coupling device 10 described herein is simple, compact, and free of the need of close manufacturing tolerances that are required of many existing braking-coupling devices; therefore, not only is the unit cost of such a device lowered, but its construction reduces the probability of failure because of wear-generated contamination (i.e., the introduction of wear-generated, metallic particles into clearances between moving parts). Moreover, the lower tolerances and larger clearances between parts utilizable in the device of the present invention minimize the effects of large temperature changes on the various components. The braking-coupling device 10 does not continuously consume and waste torque provided by the driving means 11 because of the lightly dragging contact of the sleeve 67 with the cylindrical members 49, 50, for such torque moves the sleeve away from contact with one cylindrical member and into firm contact with the other cylindrical member; thus, when a torque is imposed on the input member 73 by the driving means, there is no relative movement between the sleeve and one cylindrical member and there is substantially no dragging contact with the other cylindrical member. Likewise, the lightly dragging contact of the first and second ring-shaped members 38, 39 with their corresponding annular members 26, 27 does not consume and waste the driving-means torque, for such torque (in cooperation with the bolts 109 which connect the ring-shaped member to its associated cylindrical member 49 or 50) moves the ring-shaped member away from contact with its corresponding annular member. Consequently, the ring-shaped member 38 or 39, which is free from contact with its corresponding annular member 26 or 27, rotates with its connected cylindrical member. As the sleeve 67 does not contact one cylindrical member 49 or 50 while frictionally locked to the other cylindrical member, the other ring-shaped member 38 or 39 cannot receive the driving-means torque. The device, therefore, does not excessively consume and waste input torque.

Figure 8:
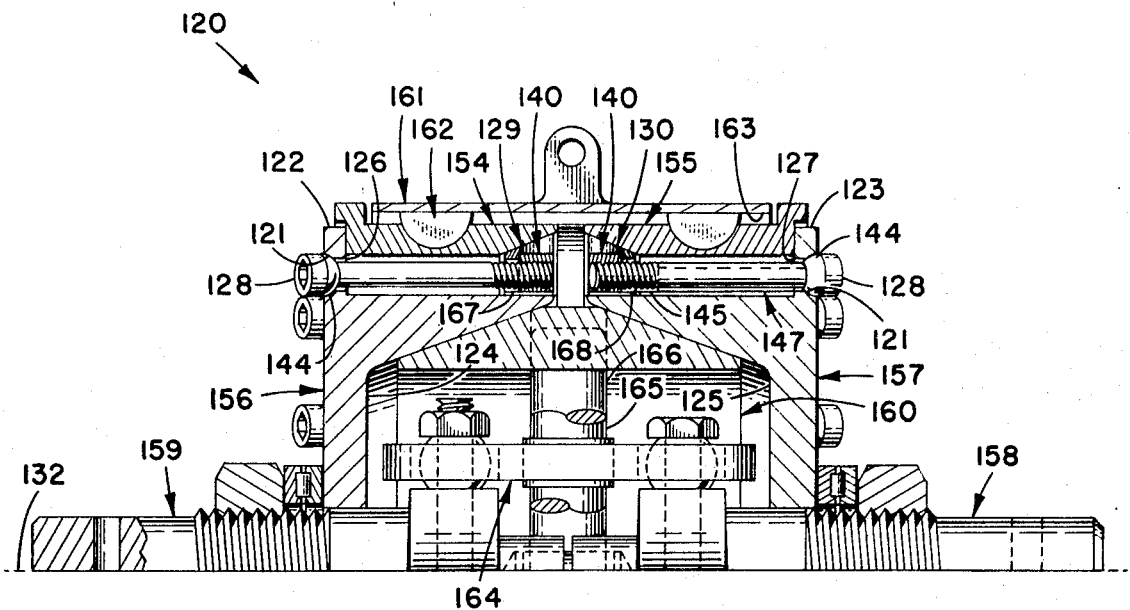
FIG. 8 is a partial, longitudinal, sectional view of a modification of the device of FIG. 2.

A modification of the present invention is depicted in FIG. 8. The bolts 128 of the modified device 120 are similar to the bolts 109 of FIG. 2, except that bending stresses are substantially eliminated from the bolts of the modified device by the addition of several components, described below. The bolts 128, therefore, are essentially subjected only to tension.

Figure 9:
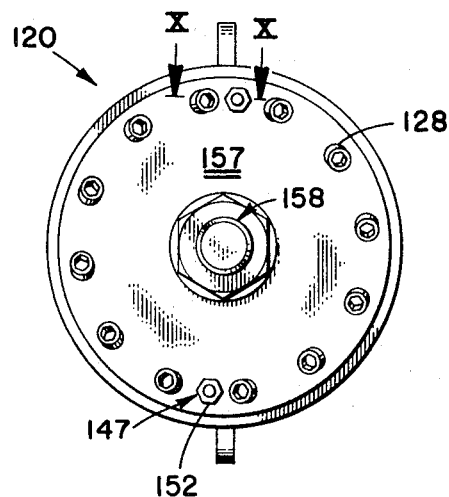
FIG. 9 is an end view of the device of FIG. 8, as viewed from the output-member side.

FIG. 9 of the modified device 120 shows, in end view, the addition of a pair of spring-pins 147 spaced 180° apart and removably attached to the second cylindrical member 157 by the nuts 152. With added reference to FIG. 10, the cylindrical member flange apertures 126, 127 of the modified device 120 have spherical seats 121 which are located in the sides of the cylindrical member flanges 122, 123 which lie in the same planes as the exterior surfaces of the cylindrical member end walls 124, 125 (FIG. 8). Each cylindrical member flange aperture 126 or 127 has a larger diameter than the diameter of the bolts relative to the apertures without introducing bending stresses into the bolts. Each of the threaded holes 48 of the ring-shaped members of FIG. 2 are replaced in the modified device's first and second ring-shaped members 129, 130 with generally cylindrical cavities 131 that have axes 136 (FIG. 11) which are perpendicular to the supporting-structure axis 132. The cavities 131 open axially through the conical outer surfaces and cylindrical inner surfaces of the ring-shaped members 129, 130, and open longitudinally into the ring-shaped member second sides 133, 134. Each ring-shaped member 129 or 130 has a plurality of lateral penetrations 135 which pierce the first and second ring-shaped member first sides 137, 138 and open into the ring-shaped members' cavities 131. The diameters of the lateral penetrations 135 are larger than the diameters of the bolts 128 which extend therethrough, thus preventing interference between the bolts and the ring-shaped members 129, 130 that could result in bending stresses in the bolts. The ring-shaped member lateral penetrations 135 also open longitudinally into the ring-shaped member inner cylindrical surfaces 167, 168 (FIG. 8). At least two holes 139 are provided in and equally spaced around each of the cylindrical member flanges 122 or 123 for mounting of the spring-pins 147 which, as will appear later, are cantilevered from the cylindrical member flanges.

A generally cylindrical barrel nut 140 (FIG. 12) is mounted in each ring-shaped member cavity 131. Each barrel nut 140 has a cylindrical exterior surface 142, a flat surface 141 formed on that cylindrical exterior surface, and a threaded hole 143 extending through the cylindrical exterior surface, which threaded hole is perpendicular to the flat surface. The barrel nut flat surfaces 141 generally face the openings of the cavities 131 in the second sides of the respective ring-shaped members 129, 130, and the barrel nut threaded holes 143 are mutually aligned with the ring-shaped member lateral penetrations 135. The cylindrical exterior surfaces of the barrel nuts 140 have closely sliding fits with the cylindrical interior surfaces of the ring-shaped member cavities 131.

A spherical washer 144 is mounted in each of the spherical seats of the cylindrical member flange apertures 126, 127, and a plurality of bolts 128 which extend through the spherical washers, the cylindrical member flange apertures, the lateral penetrations 135 of a corresponding first or second ring-shaped member 129 or 130, and engage the barrel nuts 140 which are mounted in the ring-shaped member cavities 131.

Referring to FIG. 10, at least two lugs 145, each having a side face 146, are mounted on each ring-shaped-member first side 137 or 138 and are equally spaced from each other. At least two spring-pins 147, each preferably having a generally rectangular cross section, a cylindrical portion 148, and threads 149 formed on the cylindrical portion, are mounted on each cylindrical member 156 or 157. The cylindrical end portion 148 of each of the spring-pins 147 forms a shoulder 151 at its juncture with the remaining rectangular cross-sectional portion of the spring-pin. The spring-pin cylindrical portions 148 extend through the cylindrical member flange holes 139 with the shoulders of the spring-pins 147 resting against the inner surfaces of the cylindrical member flanges 122, 123. Nuts 152 engage the spring-pin threads 149 and thus fasten the spring-pins 147 to the cylindrical members flanges 122, 123 and in cantilevered relation with the latter. A side of the distal end of each of the spring-pins 147 contacts a respective one of the ring-shaped member lug faces 146.

Figure 7:
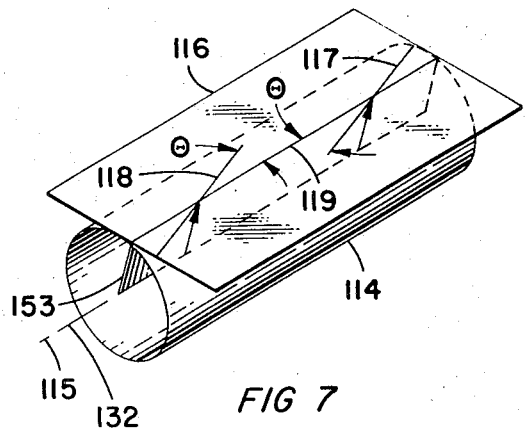
FIG. 7 is an isometric, diagrammatic view employed herein in explaining the relationship of the bolt axes relative to each other and relative to the axis of the supporting structure.

The axes of the bolts 128 which connect the cylindrical member flanges 122, 123 to their associated ring-shaped members 129, 130 have substantially the same angular relationship with the supporting-structure axis 132 of the modified device 120 as the axes of the bolts 109 with the supporting-structure axis 25 of the device of FIG. 2. As shown in FIGS. 7 and 10, one of the bolts 128 which extends through one of the first cylindrical member flange apertures 126, through one of the first ring-shaped member lateral penetrations 135, and engages the threaded hole 143 of the barrel nut 140 has an axis 117 that lies in a first theoretical plane 116; and one of the bolts 128 which extends through one of the second cylindrical member flange apertures 127, through one of the second ring-shaped member lateral penetrations 135, and engages the threaded hole of another barrel nut 140 has an axis 118 that lies in the same, first theoretical plane. A second theoretical plane 153 which contains the supporting-structure axis 132 is perpendicular to the first theoretical plane 116, and the intersection of the two theoretical planes forms a theoretical line 119 which is parallel to the supporting-structure axis and intersects the bolt axes 117, 118. The bolt axes 117, 118 are parallel to each other, and each bolt axis forms an identical, acute angle $\theta$ with the theoretical line 119.

Each of the remaining bolts 128 which extends through one of the remaining first cylindrical member flange apertures 126, through one of the remaining first ring-shaped member lateral penetrations 135, and to engagement with a remaining one of the barrel nuts 140 is paired with a respective one of the remaining bolts 128 which extends through one of the remaining second cylindrical member flange apertures 127, through one of the remaining second ring-shaped member lateral penetrations 135, and to engagement with a remaining one of the barrel nuts 140; and each pair of bolts is disposed similarly to the above-described pair of bolts. The bolts 128 are equally spaced around the supporting-structure axis 132, as shown in FIG. 9.

Prior to operation of the modified device 120, the bolts 128, which connect each of the cylindrical member flanges 122, 123 to its respective ring-shaped member 129 or 130, are tightened to bring the ring-shaped members into lightly dragging contact with their associated first and second annular members 154, 155 that mutually confront the ring-shaped members. During this time, the spring-pins 147 which are in contact with the ring-shaped member lugs 145 restrict the relative rotation of each of the cylindrical members 156 or 157 with respect to its corresponding ring-shaped member 129 or 130, which restriction of relative rotation enables the tensioning of the bolts 128 and the resulting, lightly dragging contact of the ring-shaped members with their associated annular members 154, 155.

In operation, the first and second functional modes of the modified device 120 are substantially identical to those of the device of FIG. 2, for either rotative direction of a load-imposed torque received by the output member 158 moves the sleeve 160 into firm contact with the one of the cylindrical members 156 or 157 that is prevented from rotating in that direction. A tendency toward relative rotation by the cylindrical member 156 or 157 with respect to its connected ring-shaped member 129 or 130 tends to stretch the bolts 128 connecting the two, and the resulting increase in tension of the bolts moves the ring-shaped member into firm contact with the ring-shaped member's associated annular member 154 or 155. When the ring-shaped member 129 or 130 is in firm contact with its associated annular member 154 or 155, it is thereby frictionally locked against relative rotational movement with respect to that other. As in the device of FIG. 2, the annular members of the modified device 120 are prevented from rotation relative to the supporting structure 161 by means such as keys 162 and keyways 163. Consequently, the ring-shaped member 129 or 130 prevents rotation of the cylindrical member 156 or 157 and the sleeve 160 in one rotative direction. Locking of the modified sleeve 160 prevents the transmittal of the load-imposed torque from the output member 158 to the input member 159, and retains the load 16 (FIG. 1) in a set position, just as in the device of FIG. 2.

As in the third through the sixth functional modes of the device of FIG. 2, the torque-equivalent, axial and rotational force-components received from the driving means 11 by the sleeve of the modified device 120 act respectively in an axial direction which moves the sleeve 160 into firm contact with the one of the cylindrical members 156 or 157 which is free to rotate in the same rotational direction as that of the driving-means torque and in a rotational direction which tends to rotate the sleeve in the same direction as that of the driving-means torque. The sleeve 160 is frictionally locked to the cylindrical member 156 or 157 when there is firm contact between them, and relative movement between the two components is thus eliminated. The rotational force tends to move the frictionally locked cylindrical member 156 or 157 and the sleeve 160 relative to the one of the ring-shaped members 129 or 130 that is connected by the bolts 128 to the cylindrical member that is tending to move. Consequently, the bolts 128 pivot slightly in the direction that tends to reduce the acute angles $\theta$ the bolt axes 117, 118 make with the supporting-structure axis 132, which pivoting reduces the tension in the bolts. The reduced tension in the bolts substantially eliminates the dragging contact of the ring-shaped member 129 or 130 with its associated and mutually confronting annular member 154 or 155. When contact is essentially broken between the ring-shaped member 129 or 130 and its associated annular member 154 or 155, the ring-shaped member is free to rotate and the device 120, in this condition, acts as a directly driving coupling and efficiently transmits the driving-means torque to the actuator 13 (FIG. 1) for repositioning the load 16. Before the bolts 128 pivot beyond the point necessary to release the ring-shaped member 129 or 130 from its dragging contact with its associated annular member 154 or 155, the cantilevered spring-pins 147, which are in contact with the ring-shaped member lugs 145, transmit the rotational force component received by the cylindrical member 156 or 157 from the sleeve 160 to the ring-shaped member. The ring-shaped member 129 or 130 thus rotates along with the sleeve 160 and the cylindrical member 156 or 157. Whenever the sleeve 160 is frictionally locked to the one of the cylindrical members 156 or 157 which is free to rotate, the driving-means torque is efficiently transmitted from the input member 159 to the output member 158 through the sleeve, the bellcranks 164 (only one shown), and the pins 165, 166.

Note that without the cantilevered spring-pins 147 and the ring-shaped member lugs 145, the bolts 128 would continue to pivot, while the cylindrical member 156 or 157 is rotating relative to its corresponding ring-shaped member 129 or 130, until firm contact of the ring-shaped member with its associated annular member 154 or 155 that was initially broken should occur again, thus locking the ring-shaped member, the cylindrical member, and sleeve 160 against rotation (after a small incipient rotational movement) in the direction the driving-means torque tends to rotate the sleeve.

While only one embodiment of the invention, together with a modification thereof, has been described in detail herein and shown in the accompanying drawing, it will be evident that various further modifications are possible in the arrangement and construction of its components without departing from the scope of the invention.

What is claimed is:

1. A mechanism for connecting a reversible, rotary driving means to a load to be moved and positioned thereby relative to a fixed structure, said mechanism comprising:
   a supporting structure having first and second, open ends, a longitudinal axis transfixing the ends, a material rigidly connecting the ends in a fixed relation to each other, and means for fixed mounting of the supporting structure relative to said fixed structure;
   first and second annular members each having an internally beveled end, the annular members being coaxially and fixedly positioned within the supporting structure with their beveled ends confronting each other;
   first and second ring-shaped members each having a conical outer surface complementing a respective one of the annular member internal bevels, the ring-shaped members being coaxially positioned within the supporting structure with the outer, conical surface of each of the ring-shaped members confronting a respective annular member beveled surface;
   first and second cylindrical members each having an end wall closing one end thereof and further having an open end, an aperture through its closed end, a generally cylindrical outer surface, and a generally conical inner surface extending between its closed and open ends, each cylindrical member inner surface being of greatest diameter at the open end of the corresponding cylindrical member, the first and second cylindrical members being coaxially positioned within the supporting structure and with their open ends confronting each other;
   means for connecting the cylindrical members to the ring-shaped members and for preventing rotation of one of the ring-shaped members, relative to the supporting structure, in a first direction and of the other ring-shaped member, relative to the supporting structure, in a second direction about the supporting structure axis;
   a sleeve having first and second ends, a midplane perpendicular to the supporting structure axis, and a pair of external surfaces disposed on opposite sides of the midplane, each of which external surfaces confronts and complements a respective one of the cylindrical member conical inner surfaces, the sleeve being coaxially positioned within the supporting structure and movable axially thereof throughout a range, at each extreme of which range the sleeve is in contact with at least one of the cylindrical members;
   an input member coaxial with supporting structure and extending rotatably through the first cylindrical member aperture, the input member being provided with means for drivingly connecting it to a rotary driving means;
   an output member having a longitudinal axis aligned with that of the input member and rotatably extending through the second cylindrical member aperture, the output member being provided with means for drivingly connecting it to a load;
   means joining the input member, output member, and the sleeve for concurrent rotation about the supporting axis and for preventing translation of the input and output members relative to each other; and
   means preventing inwardly directed translation of the input and output members relative to the supporting structure.

2. The mechanism of claim 1, the ring-shaped members being shaped from each other along the supporting structure axis.

3. The mechanism of claim 1, the cylindrical members being spaced from each other along the supporting structure axis.

4. The mechanism of claim 1, each of the sleeve ends being adjacent and spaced from a respective cylindrical member end wall along the supporting structure axis.

5. The mechanism of claim 1, there being provided a threaded portion on the input member and a threaded portion on the output member and the cylindrical member walls each having an exterior surface, said means preventing inwardly directed translation of the input and output members relative to the supporting structure comprising:
   a first nut engaging the input member threaded portion and a second nut engaging the output member threaded portion; and
   respective bearings mounted on the input and output members and positioned between the nuts and cylindrical members, each of the bearings being located to bear against a respective one of the cylindrical member end wall exterior surfaces.

6. The mechanism of claim 1,
   each of the cylindrical members having an external flange located at its closed end and further having a plurality of apertures therethrough, each of the cylindrical member external flanges contacting a respective one of the annular members;
   each of the ring-shaped members having a plurality of threaded holes; and
   said means for connecting the cylindrical members to the ring-shaped members and for preventing rotation of one of the ring-shaped members, relative to the supporting structure, in a first direction and of the other ring-shaped member, relative to the supporting structure, in a second direction about the supporting structure axis comprising a plurality of bolts engaging the ring-shaped member threaded holes and extending through the cylindrical member flange apertures.

7. The mechanism claimed in claim 6, wherein:

one of said bolts has an axis that lies in a theoretical plane which is tangent to a theoretical, cylindrical surface having a longitudinal axis coincident with the supporting structure axis and a radius which extends from the supporting structure axis to a point lying between the inner and outer diameters of the ring-shaped members, there being defined by the point of tangential contact between the theoretical plane and the theoretical, cylindrical surface a tangential line which is contained in both the theoretical plane and the theoretical, cylindrical surface and is thus parallel to the supporting structure axis, the bolt axis intersecting the tangential line and forming an acute angle therewith, the outer end of the radius of the theoretical, cylindrical surface occurring at the point of intersection between the tangential line and the bolt axis;

each of the remaining bolts extending through the first cylindrical member flange apertures is disposed similarly to said one bolt and equally spaced around the theoretical, cylindrical surface; and the bolts extending through the second cylindrical member flange apertures are disposed relative to the theoretical, cylindrical surface in the same manner as are the bolts extending through the first cylindrical member flange apertures.

8. The mechanism claimed in claim 7, wherein each bolt extending through one of the first cylindrical member flange apertures and engaging one of the threaded holes of the first ring-shaped member is paired with one of the bolts extending through one of the second cylindrical member flange apertures and engaging one of the threaded holes of the second ring-shaped member; and the axes of each pair of such bolts lie in the same theoretical plane and are parallel to each other.

9. The device of claim 1, each of the cylindrical members having an external flange located at its closed end, each of the cylindrical member external flanges having a plurality of apertures therethrough and contacting a respective one of the annular members, and each cylindrical member flange aperture being provided with a spherical seat;

each of the ring-shaped members having a plurality of generally cylindrical cavities that open through the ring-shaped member conical outer surfaces, first and second sides, and a plurality of lateral penetrations which extend through the ring-shaped member first sides and open into a respective one of the cylindrical member cavities, each of the cylindrical member cavities having axes which are perpendicular to the supporting-structure axis;

said means for connecting the cylindrical members to the ring-shaped members and for preventing rotation of one of the ring-shaped members, relative to the supporting structure, in a first direction and of the other ring-shaped member, relative to the supporting structure, in a second direction about the supporting-structure axis comprising:

a plurality of spherical washers each mounted within and in contact with the spherical seat of a respective one of the cylindrical member flange apertures, a plurality of generally cylindrical barrel nuts, each of the barrel nuts having a cylindrical exterior surface, a flat surface formed on its cylindrical exterior surface, and a threaded hole extending through its cylindrical exterior surface and its flat surface, the threaded hole being perpendicular to the flat surface, a one of the barrel nuts being mounted in each of the ring-shaped member cavities with the barrel nut threaded holes mutually aligned with the ring-shaped member lateral penetrations, and a plurality of bolts, each of which bolts engages the threaded hole of the barrel nut and extends through a respective one of the cylindrical member flange apertures, a respective one of the spherical washers, and a respective one of the ring-shaped member lateral penetrations.

10. The mechanism claimed in claim 9, wherein one of said bolts has an axis that lies in a first plane that is perpendicular to and intersects a second plane which contains the supporting structure axis and forms a theoretical line at its intersection with the first plane, which theoretical line is parallel to the supporting structure axis, intersects the bolt axis, and forms an acute angle with the bolt axis, each of the remaining bolts extending through the first cylindrical member flange apertures is disposed similarly to said one bolt and said remaining bolts are equally spaced around and from the supporting structure axis; and the bolts extending through the second cylindrical member flange apertures are disposed relative to the supporting structure axis in the same manner as are the bolts extending through the first cylindrical member flange apertures.

11. The device claimed in claim 10, wherein each bolt extending through one of the first cylindrical member flange apertures, extending through one of the first ring-shaped member lateral penetrations, and engaging one of the threaded holes of one of the barrel nuts mounted in the first ring-shaped member cavities is paired with one of the bolts extending through the second cylindrical member flange apertures, extending through one of the second ring-shaped member lateral penetrations, and engaging one of the threaded holes of one of the barrel nuts mounted in the second ring-shaped member cavities; and the axes of each pair of such bolts lie in the same theoretical plane and are parallel to each other.

12. The mechanism of claim 1, wherein the input member has an end portion and the output member has an end portion, the input and output member end portions being in mutually confronting relationship and each having a cylindrical recess that is coaxial with the supporting structure, and said means joining the input member, output member, and the sleeve for concurrent rotation about the supporting structure axis and for preventing translation of the input and output members relative to each other comprises:

first and second, parallel pins mounted within the sleeve and having axes which lie in the sleeve midplane;

first and second bellcranks each having first and second end portions and a central portion, each of said bellcranks being pivotally and rotatably mounted at its central portion on a respective one of the pins, means for pivotally and rotatably fastening the bellcrank first end portions to the input member, means for pivotally and rotatably fastening the bellcrank second end portions to the output member; and a cylindrical dowel mounted within the recesses of the input and output members.

13. The mechanism claimed in claim 12, wherein the input member is positioned between the respective bellcrank first end portions, the output member is positioned between the respective bellcrank second end portions, and said means for pivotally and rotatably fastening the bellcrank first end portions to the input member and the bellcrank second end portions to the output member comprises:

a plurality of self-aligning bearings, a respective one of said bearings being mounted on each end portion of each of the bellcranks; and first and second bolts and nuts having axes parallel to each other and perpendicular to the supporting structure axis, the first bolt extending through the self-aligning bearings mounted on the bellcrank first end portions and through the input member, and the second bolt extending through the selfraligning bearings mounted on the bellcrank second end portions and through the output member.

* * * * *